(12) United States Patent
Menken et al.

(10) Patent No.: US 12,263,433 B2
(45) Date of Patent: Apr. 1, 2025

(54) FRAMED AIR FILTER WITH STABILIZING FLAP

(71) Applicant: 3M INNOVATIVE PROPERTIES COMPANY, St. Paul, MN (US)

(72) Inventors: Fiona E. Menken, Woodbury, MN (US); Kimberly W. Gerwig, Woodbury, MN (US); Glen O. Gregerson, Hudson, WI (US); David W. Ziemann, Coon Rapids, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 117 days.

(21) Appl. No.: 17/909,712

(22) PCT Filed: Mar. 23, 2021

(86) PCT No.: PCT/IB2021/052404
§ 371 (c)(1),
(2) Date: Sep. 6, 2022

(87) PCT Pub. No.: WO2021/191797
PCT Pub. Date: Sep. 30, 2021

(65) Prior Publication Data
US 2024/0207769 A1    Jun. 27, 2024

Related U.S. Application Data

(60) Provisional application No. 63/000,013, filed on Mar. 26, 2020.

(51) Int. Cl.
*B01D 46/00*    (2022.01)
*B01D 46/10*    (2006.01)

(52) U.S. Cl.
CPC ......... *B01D 46/0016* (2013.01); *B01D 46/10* (2013.01)

(58) Field of Classification Search
CPC .. B01D 46/10; B01D 46/0016; B01D 46/521; B01D 46/523
USPC ..... 55/490, 495, 499, 501, DIG. 5, DIG. 31; 96/74; 156/60
See application file for complete search history.

(56) References Cited

U.S. PATENT DOCUMENTS 2,965,197 A     12/1960  Dow et al.
3,938,973 A  *   2/1976  Kershaw ................. F24F 13/28
                                                              55/501

(Continued)

FOREIGN PATENT DOCUMENTS

WO    2012134636 A1    10/2012
WO    2020026149 A1     2/2020
WO    2020026152 A1     2/2020

OTHER PUBLICATIONS

International Search Report for PCT International Application No. PCT/IB2021/052404, mailed on Jun. 25, 2021, 4 pages.

*Primary Examiner* — Minh Chau T Pham
(74) *Attorney, Agent, or Firm* — Kenneth B. Wood

(57) ABSTRACT

A framed air filter that includes air filter media and a frame with four frame portions. At least one corner of the frame is a bonded, non-integral corner at which a stabilizing flap that integrally extends from a first frame portion of a pair of neighboring frame portions that meet to form the non-integral, bonded corner, is affixed to an inner sidewall of a second frame portion of the pair of neighboring frame portions.

17 Claims, 6 Drawing Sheets

(56) References Cited

U.S. PATENT DOCUMENTS

| | | | |
|---|---|---|---|
| 6,033,454 A * | 3/2000 | Hoeffken | B01D 46/10 55/494 |
| 8,702,829 B2 | 4/2014 | Lise et al. | |
| 9,962,640 B2 * | 5/2018 | Fox | B01D 46/64 |
| 11,376,537 B2 | 7/2022 | Menken et al. | |
| 2004/0112526 A1 | 6/2004 | Choi et al. | |
| 2007/0294988 A1 * | 12/2007 | Miller | B01D 46/0002 55/501 |
| 2010/0263542 A1 | 10/2010 | Heberer et al. | |
| 2013/0047563 A1 * | 2/2013 | Sauer | A47L 9/1436 55/378 |
| 2013/0327004 A1 * | 12/2013 | Lise | B01D 46/0002 55/501 |
| 2015/0047508 A1 * | 2/2015 | Sanocki | B01D 46/523 156/60 |
| 2015/0265957 A1 * | 9/2015 | Fox | B01D 46/64 55/497 |
| 2019/0046910 A1 | 2/2019 | Gregerson | |
| 2019/0242616 A1 | 8/2019 | Gregerson et al. | |
| 2023/0182059 A1 * | 6/2023 | Horiye | B01D 46/0001 55/521 |

* cited by examiner

FRAMED AIR FILTER WITH STABILIZING FLAP

CROSS REFERENCE TO RELATED APPLICATIONS

This application is a national stage filing under 35 U.S.C. 371 of PCT/IB2021/052404, filed 23 Mar. 2021, which claims the benefit of U.S. Provisional Patent Application No. 63/000,013, filed 26 Mar. 2020, the disclosure of which is incorporated by reference in its/their entirety herein.

BACKGROUND

Air filters are commonly used in forced air systems, e.g. residential heating and air-conditioning systems and room air purifiers, in order to remove dust and dirt particles and the like.

SUMMARY

Herein is disclosed a framed air filter and method of making. The framed air filter includes air filter media and a frame with four frame portions. At least one corner of the frame is a bonded, non-integral corner at which a stabilizing flap that integrally extends from a first frame portion of a pair of neighboring frame portions that meet to form the non-integral, bonded corner, is affixed to an inner sidewall of a second frame portion of the pair of neighboring frame portions. These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Although terms such as "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties). The term "substantially" means to a high degree of approximation (e.g., within +/−10% for quantifiable properties) but again without requiring absolute precision or a perfect match. The term "essentially" means to a very high degree of approximation (e.g. within +/−4% for quantifiable properties) but again without requiring absolute precision or a perfect match.

Terms such as "outer", "outward", "outwardmost", "outwardly", and the like, refer to a direction generally away from the geometric center of the air filter media. Terms such as "inner", "inward", "inwardmost", "inwardly", and the like, refer to a direction generally toward the geometric center of the air filter media.

Figure 1:
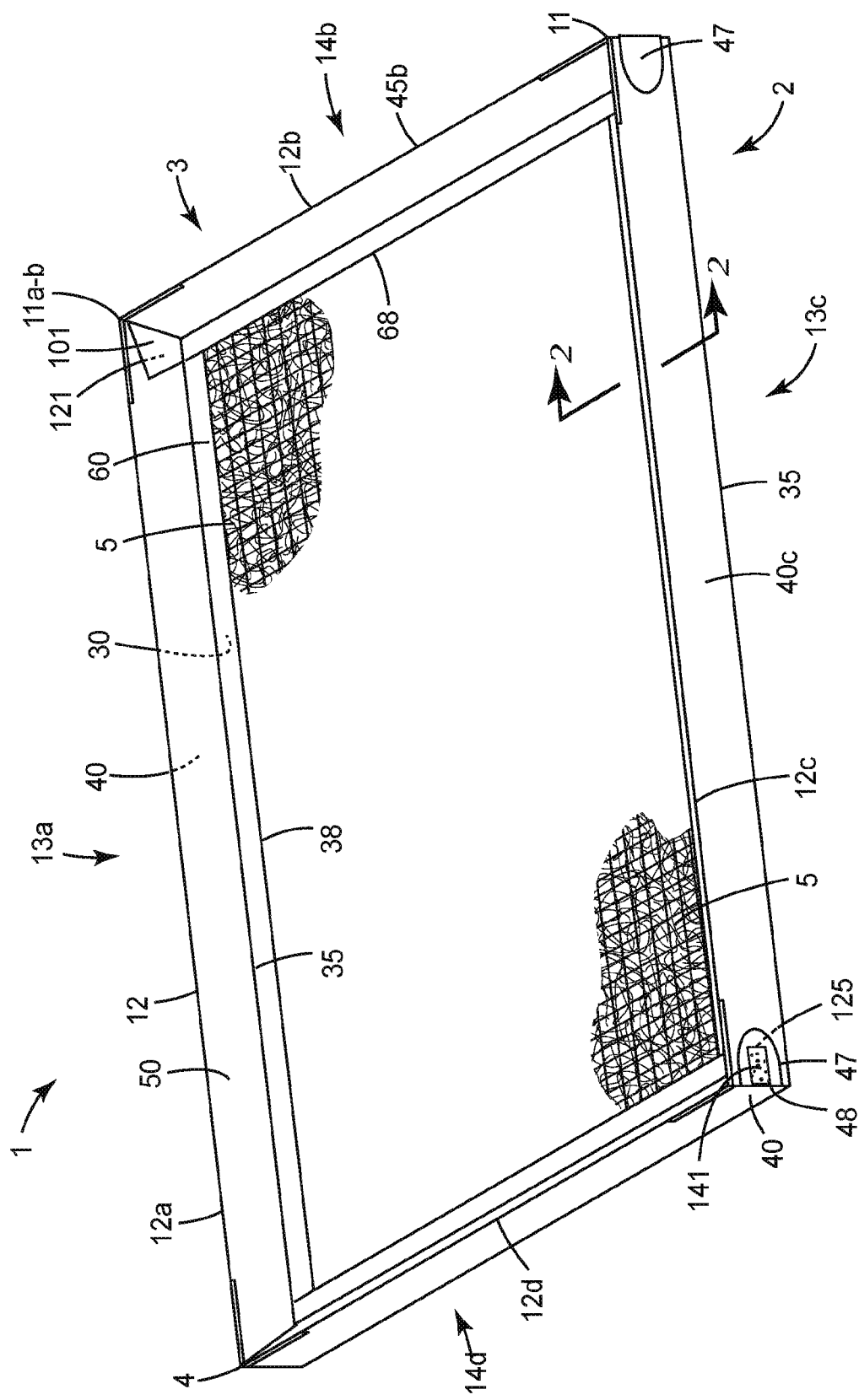
FIG. 1 is a perspective view of an exemplary framed air filter as disclosed herein, viewed from the downstream side of the framed air filter.
Figure 2:
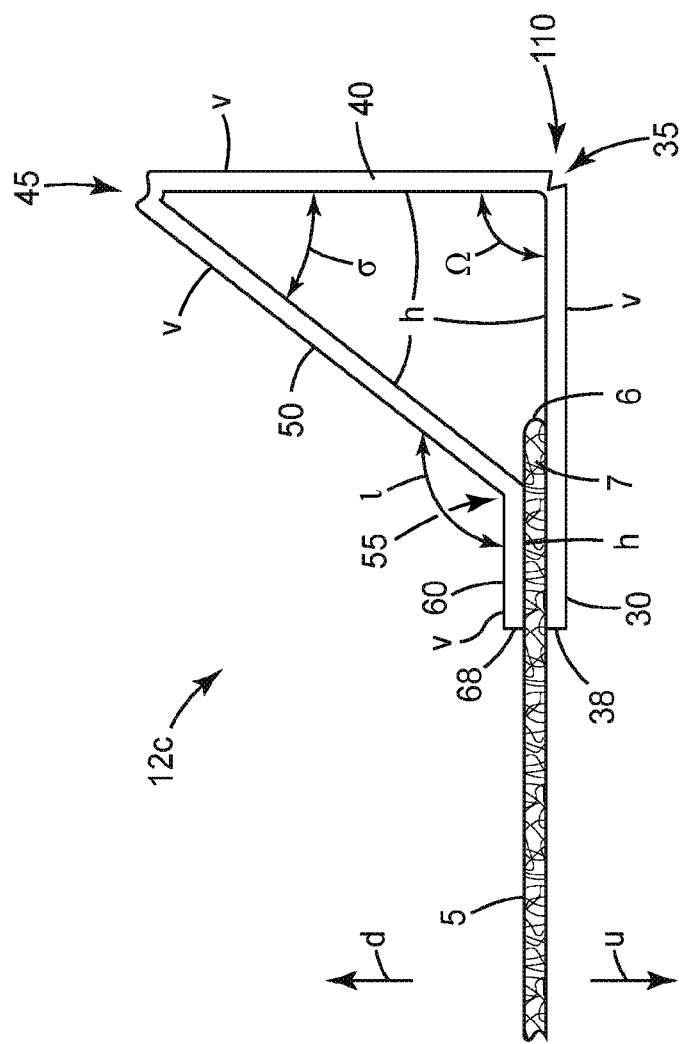
FIG. 2 is a cross-sectional slice view of a portion of the exemplary framed air filter of FIG. 1, taken along line 2-2.
Figure 5:
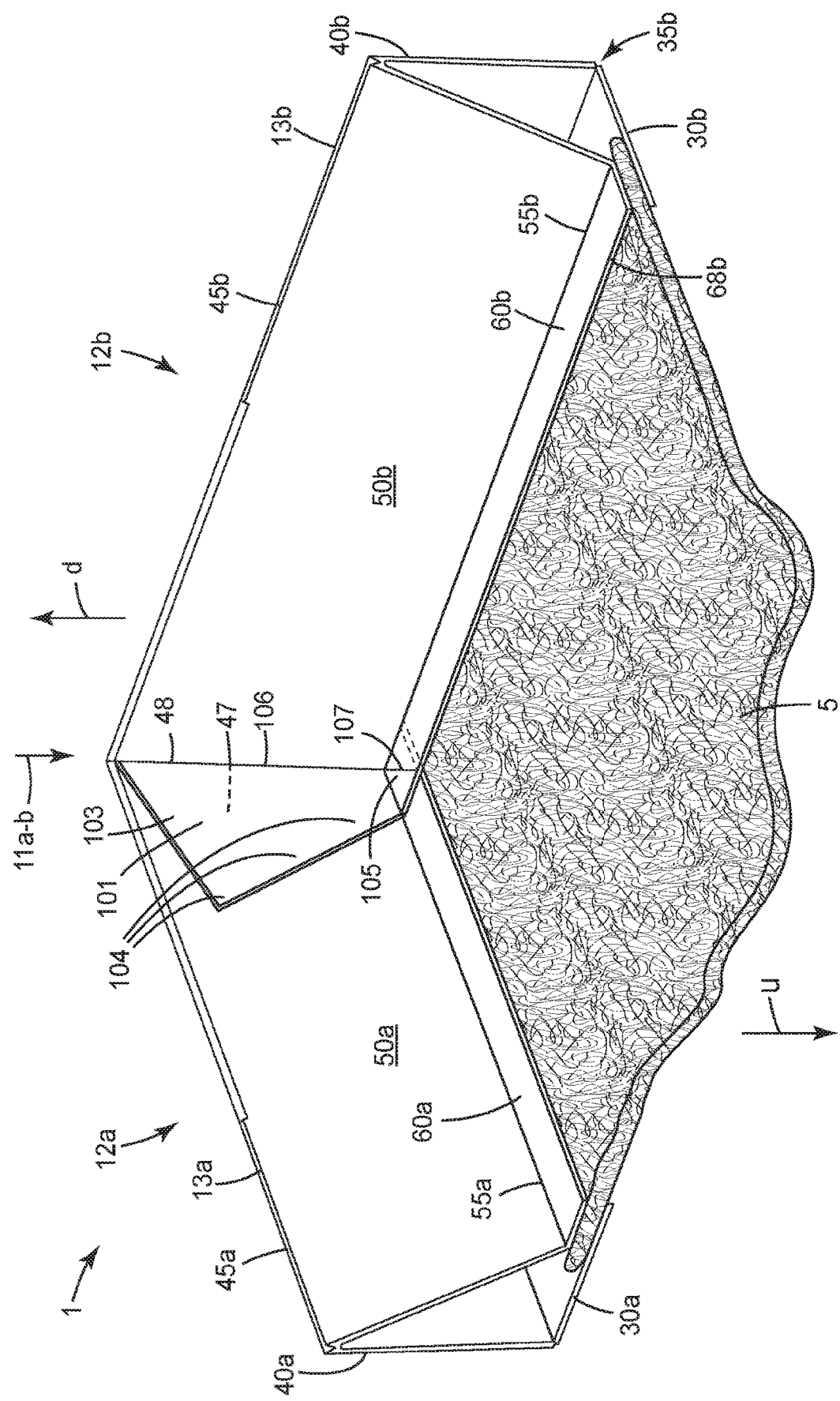
FIG. 5 is a perspective view of a corner of an exemplary framed air filter.

The term "upstream" is used to denote the closed-end side of a framed air filter, corresponding to the far side of filter 1 as shown in FIG. 1 and to the lower side of filter 1 as shown in FIG. 2. The term "downstream" is used to denote the open-ended side of such an air filter (the side to which the filter frame sidewalls protrude away from the major plane of the filter media), corresponding to the near side (the viewed side) of filter 1 as shown in FIG. 1 and to the upper side of filter 1 as shown in FIG. 2. (FIGS. 2 and 5 are marked with "u" and "d" to aid in recognition of upstream and downstream sides of the filter and components.) These terms are used purely for convenience of description herein, in recognition of the observation that such filters are often placed into forced-air ventilation systems with the closed-end side of the filter facing the stream of incoming air (i.e., facing upstream) and with the open-ended side of the filter facing downstream (e.g. with the terminal ends of the sidewalls resting against support flanges of the forced air ventilation system). However, it will be appreciated that in some cases such filters might be placed in an airstream in the reverse orientation: thus, it is emphasized that the terms upstream and downstream are used herein merely for convenience of description of various components of the filter and their geometric relationship, irrespective of how such a filter might be eventually installed into a forced air ventilation system.

Figure 3:
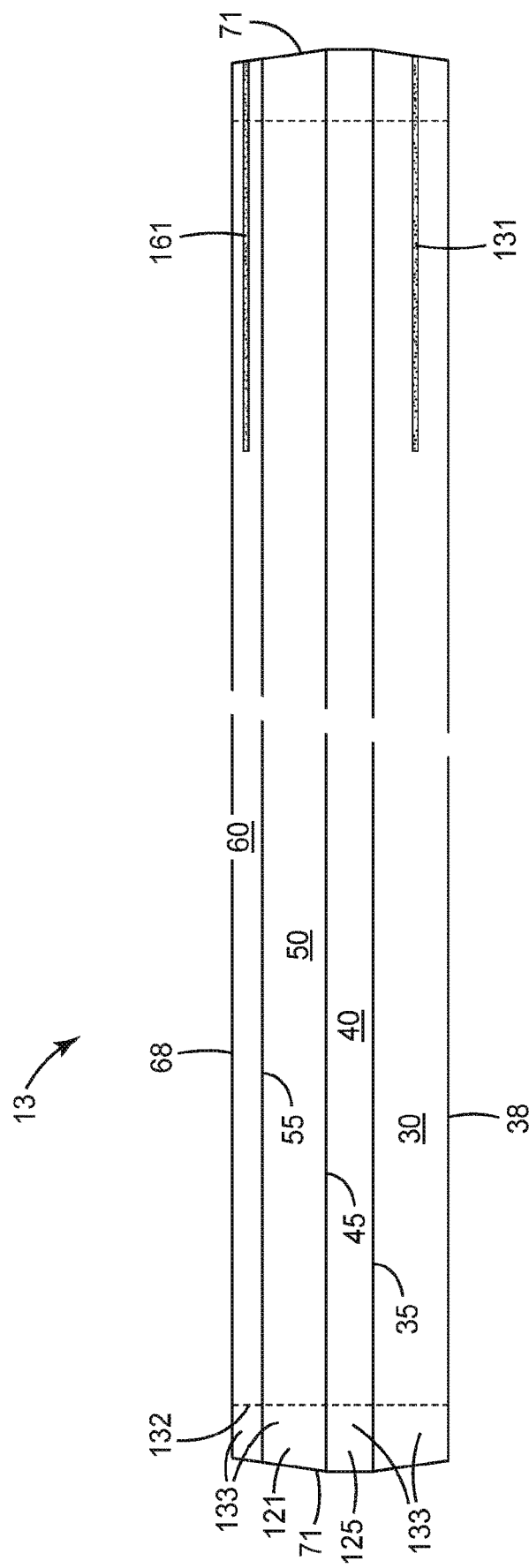
FIG. 3 is a plan view of a portion of an exemplary frame piece that may be folded and assembled with other frame pieces to form a filter frame.
Figure 4:
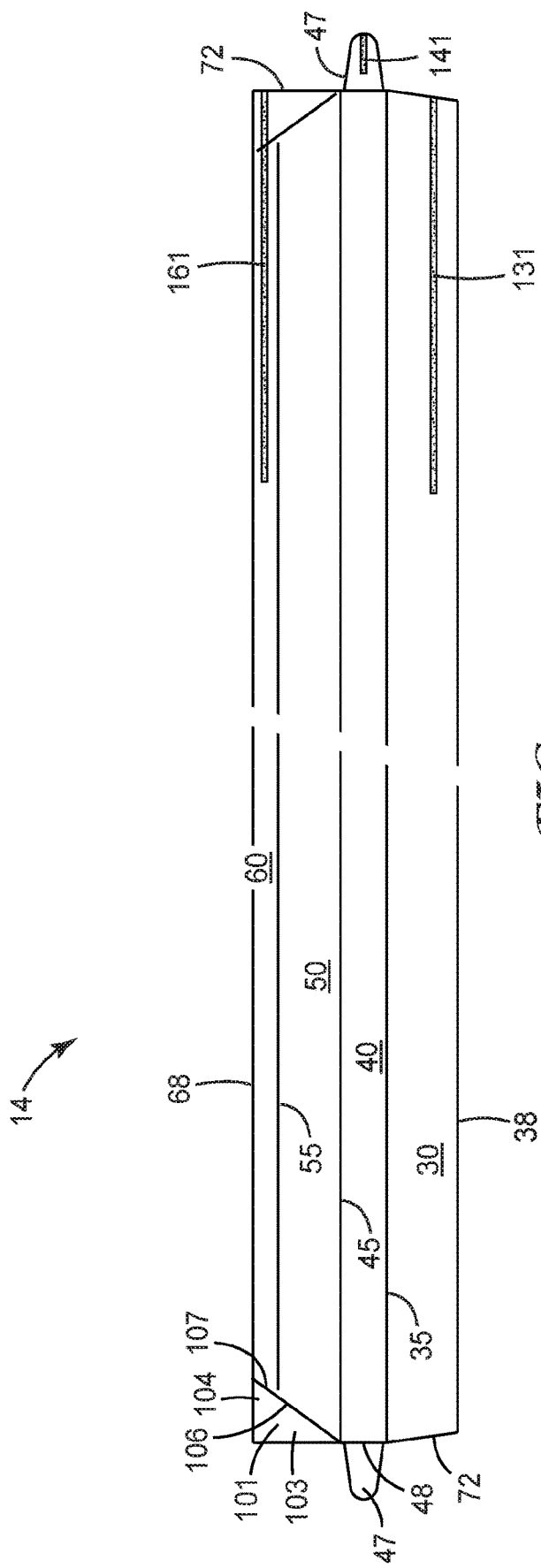
FIG. 4 is a plan view of a portion of another exemplary frame piece that may be folded and assembled with other frame pieces to form a filter frame.

The term "frame portion" is used to denote a portion of an assembled frame that is mounted on a particular edge of the filter media. The term "frame piece" is used to denote a piece of material (that is typically flat as received) that can be folded to form a frame portion and can be joined to other folded frame pieces to form an assembled frame. (Exemplary frame pieces are depicted in FIGS. 3 and 4.)

The term "hidden" denotes surfaces of a frame portion that are not visible from any viewing perspective: the term "visible" denotes surfaces that are visible from some viewing perspective. Hidden surfaces "h" and visible surfaces "v" of an exemplary frame portion are indicated in FIG. 2. This nomenclature is also applied to surfaces of frame pieces (noting that, strictly speaking, the condition of visible or hidden will not take effect until the frame piece is folded into a frame portion and assembled into a frame).

The term "affixed" broadly encompasses any method of joining, whether by the use of adhesive bonding, by mechanical fastening methods such as stapling, or any combination thereof.

DETAILED DESCRIPTION

Shown in FIG. 1 in perspective view from the downstream side is an exemplary framed air filter 1 as disclosed herein. Shown in FIG. 2 is a cross-sectional slice view of a portion of the exemplary air filter of FIG. 1, taken along line 2-2 of FIG. 1. Air filter 1 comprises an upstream side 2 and a downstream side 3, as depicted in FIGS. 1 and 2 and as defined and described above. Air filter 1 comprises air filter media 5 and frame 12 mounted generally on, and surrounding, perimeter 6 of filter media 5. Air filter 1 is at least generally rectangular in shape (which specifically includes square shapes) with four corners 4, with filter media 5 thus having a generally rectangular perimeter 6.

For convenience in describing such generally rectangular geometry, the four major portions of frame 12 and components thereof may occasionally be referred to herein by a lettered subscript (e.g., a, b, c, or d). Not all corresponding features of the various frame portions are individually identified by number in the Figures, but will be understood to be present in many embodiments. Similarly, not all components or features will be individually subscripted to denote the particular frame portion in which they are depicted in the various Figures, but it will be understood that all such subscripts can be applied as needed.

Frame 12 may thus take the form of a rectangular frame with four major elongate frame portions (12a, b, c and d as indicated in FIG. 1) that are each mounted on one of the four major edges of the filter media and with pairs of neighboring frame portions meeting to form four corners 11 of frame 12. (For example, frame portion pair 12a and 12b meet to form corner 11a-b as indicated in FIG. 1.) In some embodiments, opposing frame portions (e.g. 12a and 12c, and 12b and 12d) may be identical to each other as discussed later herein.

As most easily seen in FIG. 2, at least one frame portion of frame 12 comprises a downstream flange 60 and an upstream flange 30, which flanges are positioned relatively close to each other (e.g. within 3, 2 or 1 mm) and generally parallel to each other so as to compressively hold border portion 7 of filter media 5 therebetween. Frames of this general type are sometimes referred to as pinch frames or compression frames, and are distinguished from e.g. channel frames that exhibit a generally U-shaped profile in which upstream and downstream flanges are relatively far from each other and in which the filter media is not necessarily held with any significant degree of compression. In many embodiments, all four frame portions of frame 12 will be of this design. In some embodiments, an inwardmost edge 68 of downstream flange 60 may be aligned (along an inward-outward direction, as evident in FIG. 2) within e.g. about 4 mm, 2 mm, 1 mm, 0.5, 0.1, or 0.0 mm of an inwardmost edge 38 of upstream flange 30.

Such a portion of frame 12 further comprises an outer sidewall 40, which extends downstream (and in some embodiments, outward) from upstream flange 30 and is foldably connected thereto at outer junction 35 as shown in FIG. 2. Upstream flange 30 and outer sidewall 40 define an outer angle $\Omega$ with a vertex coinciding with outer junction 35. Outer angle $\Omega$ will, in many embodiments, be greater than 80 degrees. In various embodiments, outer angle $\Omega$ may be at least 80, 90, 100, 110, or 120 degrees. In further embodiments, outer angle $\Omega$ may be at most 145, 135, 125, 115, 105, or 95 degrees. In some specific embodiments, outer angle $\Omega$ may be within plus or minus 5, or 10 degrees of 90 degrees (i.e., 85-95 degrees, as in the exemplary design of FIG. 2). For example, a nominal outer angle of e.g. 90 degrees may be targeted in production.

The portion of frame 12 further comprises an inner sidewall 50, which extends outward and downstream from downstream flange 60 and is foldably connected thereto at inner junction 55. Downstream flange 60 and inner sidewall 50 define an inner angle $\tau$ with a vertex coinciding with inner junction 55. Inner angle $\tau$ will, in many embodiments, be greater than 100 degrees. In various embodiments, inner angle $\tau$ may be at least 100, 110, 120, or 130 degrees. In further embodiments, inner angle $\tau$ may be at most 165, 155, 145, 135, or 125 degrees. In some specific embodiments, inner angle $\tau$ may be in the range of 125-140 degrees. For example, a nominal angle of e.g. 130-135 degrees may be targeted in production.

The portion of frame 12 is configured so that outer sidewall 40 and inner sidewall 50 meet each other, and are foldably connected to each other, at sidewall junction 45 as indicated in FIG. 2. Outer sidewall 40 and inner sidewall 50 define a sidewall angle $\sigma$ with a vertex located at sidewall junction 45. Sidewall angle $\sigma$, in many embodiments, will be less than 65 degrees. In further embodiments, sidewall angle $\sigma$ may be at most 55, 45, 35, 25, 15, or 5 degrees. In various embodiments, sidewall angle $\sigma$ may be at least 0, 10, 20, 30, 40, 50 or 60 degrees. In some specific embodiments, sidewall angle $\sigma$ may be in the range of 40-55 degrees. For example, a nominal sidewall angle of e.g. 45 degrees may be targeted in production.

In many embodiments, all four filter frame portions (e.g., 12a-12d) may comprise the above-recited upstream and downstream flanges and inner and outer sidewalls and junctions/foldable connections therebetween. In this context, the term foldable signifies that a frame portion is formed (i.e. into a folded configuration of the general type shown in FIG. 2) by starting with a frame piece that is flat as made (e.g. of the general type depicted in FIG. 3 or 4), and folding various panels of the frame piece relative to each other along various score/fold lines as described later herein in detail. The term foldable does not denote that the frame portion (or the entirety of frame 12), once formed, is foldable in the sense that it can be collapsed or folded flat. In fact, as will be made clear herein, in various embodiments frame 12, once formed, will not be collapsible or foldable.

A frame piece can thus be transformed from a flat configuration e.g. of the general type shown in FIG. 3 or 4, into a folded configuration of the general type shown in FIG. 2, by folding the panels of the frame piece along appropriate fold lines that provide the foldable connections/junctions between the panels of the frame piece. (Strictly speaking, the panels of a frame piece will not become flanges or sidewalls until the panels are actually folded to form a frame portion. However, such panels of a frame piece may occasionally be referred herein to as flanges or sidewalls for convenience of description.) To facilitate these folding operations, the frame piece can be provided with score lines that cause the frame piece to preferentially fold along the score lines. That is, a fold line is an elongate line that follows (i.e., is dictated by, and thus coincides with) a score line. In many embodiments, such a score/fold line may be at least substantially or essentially straight line. Thus, the above-described inner junction, outer junction, and sidewall junction, can respectively extend along an inner fold line, an outer fold line, and a sidewall fold line, that are respectively defined by an inner score line, an outer score line, and a sidewall score line.

Several types of scoring can be used to provide a score line/fold line or a segment thereof. A first type of score line is a cut-scored line. In cut-scoring, the material (e.g. paperboard, chipboard or the like) of a frame piece is cut e.g. with a sharp blade that penetrates partially, but not completely, through the thickness of the frame piece. That is, the cutting blade penetrates into a first, contact surface of the frame piece but stops short of penetrating through to the opposing, second surface. In specific embodiments, a cut-scored line may comprise a depth of penetration of from at least 40, 45, 50, or 55, to at most 80, 75, 70, 65, or 60 percent, of the thickness of the frame piece. The remaining uncut material can act as a hinge allowing the two panels that are connected by the hinge to be foldably moved relative to each other.

A cut-scored line (when viewed in cross-section along the long axis of the score line, prior to folding) typically takes the form of a relatively narrow and high-aspect ratio cut or fissure with relatively little deformation of the material of the frame piece at locations laterally adjacent to the cut and/or on the opposing, second surface of the material. Panels are customarily folded along cut-scored lines in a direction that causes the cut to open wider ("open" folding, as discussed in detail later herein). This is to avoid the faces of the cut-score binding against each other and resisting the folding, as will be readily apparent to ordinary artisans.

A second type of score line is a crush-scored line. In crush-scoring, the material of a frame piece is contacted with a member that is relatively rounded/blunt and/or wide in comparison to a blade used for cut-scoring. Such a crush-scored line (when viewed in cross-section along the long axis of the score line, prior to folding) typically takes the form of a relatively wide and shallow, inwardly-deformed recess on the contact side of the frame piece, with a corresponding outwardly-deformed, rounded protrusion on the opposite side of the frame piece. (In contrast, a cut-score may be only faintly visible, or not visible at all, when viewed from the opposite side of the frame piece.) Panels are customarily folded along crush-scored lines in a direction that causes the first-side recess to open wider, for similar reasons to those described above for cut-score lines.

A third type of scoring is perforation. As defined herein, perforating ("perfing") is a process in which successive, spaced apart areas (that are e.g. aligned along a linear path) of frame piece material are cut e.g. with a blade that passes through the entire thickness of the frame piece to leave a through-hole. A perf-scored line thus comprises a succession of through-holes that are spaced apart along a frame piece.

By whatever method a score line is provided, such a score line can define a fold line along which two areas (e.g. panels) of a frame piece will preferentially fold upon the application of appropriate bending force to the areas. A score line will thus be present at (and in fact will have defined) the junctions between various panels, flanges, etc., in a frame portion that results from the folding process. The various fold lines disclosed herein may make use of any desired score line, chosen e.g. from any of the above general categories. In some embodiments, combinations of score lines of various types may be used. If multiple types of scoring are to be performed, if desired they may all be performed on the same surface of the frame piece and/or at the same time, e.g. using a rotary-scoring apparatus or a batch scoring apparatus. If desired, the outer borders of the frame piece may be cut, e.g. die-cut, in the same operation.

In some embodiments a score line may exhibit segments in which different types of scoring are used. Such arrangements are discussed in detail in U.S. Provisional Patent Application 62/755,082 and in the resulting U.S. National patent application Ser. No. 16/671,585, both of which are incorporated by reference herein in their entirety for the purpose of describing various scoring/folding arrangements. Any of the arrangements disclosed and/or pictured in the '082 and the '585 documents may be used in combination with any of the arrangements described in the present disclosure. (Various types and/or combinations of score lines may be apparent in certain Figures of the present disclosure: all such depictions are exemplary and the arrangements disclosed in the present document are not limited to use with only the particular types of score lines shown in the Figures.)

In some embodiments, surfaces of frame pieces that are to be visible surfaces (surfaces "v" in FIG. 2) in the assembled frame, may be e.g. surface-coated to provide an aesthetically pleasing appearance. Often, such a surface coating may comprise a pigment (e.g. a white pigment such as clay, titanium dioxide, barium sulfate, or the like): additionally, this surface may be printed with various indicia, decorations, or the like. In contrast, the opposing surfaces of frame pieces, that are to be hidden surfaces (surfaces "h" in FIG. 2), may not be visible to any significant extent and thus are often left uncoated and/or unprinted for purposes of economy. (However, if desired at least a portion of a hidden surface (e.g. a portion that is to be bonded) of a frame piece may be coated e.g. with an adhesion-promoting primer or similar material.)

A frame piece may be scored on the hidden surface, and/or on the visible surface, as desired. In many embodiments the scoring may be performed on the visible surface of the frame piece, followed by "open" folding of the frame piece to form a frame portion. "Open" folding denotes a folding operation that, along the score, causes the opposing faces of the panels to open (that is, to move apart from each other, rather than to impinge against each other). Fold lines/junctions 35 and 45 as depicted in FIG. 2, are representative examples of open folding. Open folding, when applied to a frame piece that was scored on the "visible" surfaces of the frame piece, will result in this surface of the frame piece (i.e. the surface that was e.g. coated, printed, etc. for aesthetic effect) being exposed (i.e., "visible"), as can be readily appreciated from inspection of FIG. 2.

A case in which areas of a frame piece are folded the opposite way, i.e. so that, along the score, the opposing faces of the areas move toward each other (e.g. so as to narrow or close off the groove formed by the scoring), will be referred to herein as "reverse" folding. Fold line/junction 55 as depicted in FIG. 2 is an example of reverse folding. Such procedures are not commonly performed in the art for reasons noted earlier herein. However, in some instances particular areas of frame pieces may be reverse-folded, as discussed in detail later herein.

In various embodiments inner sidewall 50 and outer sidewall 40 may be positioned at various sidewall angles σ relative to each other (when viewed in cross section as shown in FIG. 2, and as measured from the vertex provided by sidewall fold line/junction 45). Ordinary artisans will appreciate that the sidewall angle of the frame portions, e.g. in combination with other parameters such as the outer angle Ω of the frame portions, can be chosen so that in some embodiments the frame is not nestable. In other embodiments such parameters can be chosen so that the framed air filter is nestable.

By nestable is meant that multiple filters 1 (of at least substantially the same shape and size), can be stacked so that they collectively occupy less than 70% of the total height obtained by multiplying the height of each filter (along the upstream-downstream direction) by the number of filters. It will be appreciated that framed air filters of the type depicted in FIGS. 1 and 2 are not nestable. In some embodiments, a non-nestable framed filter will comprise four frame portions in which the outer angle Ω has a nominal value of approximately 90 degrees (e.g. as in the exemplary design of FIG. 2). It will be appreciated that in actual production of framed filters, some deviation from this nominal value may occur. Thus in various embodiments the outer angle Ω may vary between e.g. 80 degrees and 100 degrees.

In some embodiments, the four portions (12a-d) of frame 12 may be obtained from four individual, separately made frame pieces that are assembled with/connected to each other, and folded, to form frame 12. For example, in the exemplary embodiment of FIG. 1, individual, separately made frame pieces 13a, 14b, 13c, and 14d respectively provide frame portions 12a, 12b, 12c, and 12d. In some embodiments, a first pair of opposing frame portions 12a and 12c may be made from a first pair of identical frame pieces (e.g. 13a and 13c): similarly, a second pair of opposing frame portions 12b and 12d may be made from a second pair of frame pieces (14b and 14d) that are identical to each other (and that are different from 12b and 12d). The pairs of opposing frame pieces/portions will be arranged in alternating sequence around the perimeter of the filter media, as shown in FIG. 1. Such an arrangement will provide a frame in which all four corners of the frame are bonded corners and no corner of the frame is an integral corner, as discussed in detail later herein.

In other embodiments, one frame piece may provide two neighboring frame portions (e.g. 12a and 12b) and another frame piece may provide the two remaining neighboring frame portions (e.g. 12c and 12d). Such a frame piece may take the form of (e.g. after partial folding) an L-shaped frame piece in which the two arms of the L are integrally joined to each other by an integral, foldable connection e.g. between the outer sidewalls of the arms of the L. Such arrangements will provide a frame in which at least one corner of the frame is an integral corner (rather than a bonded corner). For example, such a frame may thus comprise two diagonally-opposing frame corners that are integral corners and two remaining diagonally-opposing frame corners that are bonded corners.

A frame portion will be formed via the folding of foldably-connected, elongate panels of at least a part (or the entirety) of a frame piece. An exemplary frame piece 13 from which can be formed a frame portion of the general type shown in FIG. 2, is depicted in exemplary representation in FIG. 3. The frame piece 13 of FIG. 3 comprises panels 30 and 60 that, upon folding, will respectively form the upstream flange and the downstream flange of the resulting frame portion Terminal edges 38 and 68 of the frame piece will form corresponding edges 38 and 68 of the thus-formed flanges. The frame piece further comprises panels 40 and 50 that will respectively form the outer and inner sidewalls of the frame portion.

Panels 30 and 40 are joined to each other by a score/fold line that, when the panels are folded along the score line, will provide outer junction 35. Panels 50 and 60 are similarly joined to each other by a score/fold line that, when the panels are folded along the score line, will provide inner junction 55. Panels 40 and 50 that will form the outer and inner sidewalls, are joined by a score/fold line that, when the panels are folded along the score line, will form sidewall junction 45. Exemplary frame piece 14 as shown in FIG. 4, comprises panels 30, 40, 50, and 60, and junctions 35, 45 and 55 in similar manner to frame piece 13 of FIG. 3, and can be folded in a similar manner to form a frame portion. The differences between frame pieces 13 and 14 are discussed in detail later herein.

As noted, in some embodiments one or more corners 11 of frame 12 may be an integral corner in which at least some part of the respective frame portions are integrally connected to each other. For instance, a type of integral corner that is commonly used in the art comprises a pair of neighboring frame portions in which the outer sidewalls of the two frame portions are integrally connected to each other.

In some embodiments, one or more corners 11 of frame 12 may be a bonded corner. By definition, a bonded corner is a non-integral corner in which no part of the two frame pieces that meet to form the corner, are integral with each other as made. Rather, some part or parts of the first frame piece/portion are bonded (affixed) to some part or parts of the second frame piece/portion in the process of forming the frame. As discussed in detail herein, one such part that is bonded in this manner may be a stabilizing flap of one of the frame portions.

Two frame pieces can be brought together, folded to form neighboring frame portions, and assembled to each other to form a corner, e.g. in the following general manner. As an example, the formation of corner 11a-b (as shown in the upper right of FIG. 1, and as shown in magnified view in FIG. 5) from frame portions 12a and 12b will be discussed. Frame portions 12a and 12b can be respectively obtained from frame pieces 13 and 14 as depicted in FIGS. 3 and 4. Frame piece 13 can be folded in the general manner described earlier herein, to form a frame portion 12a whose right-hand end has the general configuration shown in FIG. 5. Frame piece 14 can be similarly folded, to form a frame portion 12b whose left-hand end has the general configuration shown in FIG. 5. The frame portions can be brought together e.g. so that a terminal end of one frame piece/portion (e.g. terminal end 71 of frame piece/portion 13a/12a as denoted in FIG. 3) is nestled in an interior space defined within a terminal end portion of the neighboring frame piece/portion 13b/12b. Typically, at least a portion of terminal end 71 of frame portion 12a (e.g. the edge of terminal end 71 that is provided by outer sidewall 40) will be abutted against a hidden surface of frame portion 12b.

In some embodiments, end sections of the elongate downstream flange and the elongate upstream flange of one of the frame portions may be sandwiched (along an upstream-downstream direction u-d as shown in FIG. 5) between end sections of the elongate downstream flange and the elongate upstream flange of the neighboring frame portion. For example, in the exemplary arrangement of FIG. 5, end sections of flanges 60a and 30a of frame portion 12a are sandwiched between end sections of flanges 60b and 30b of frame portion 12b.

Such a corner can be held in the desired configuration in any desired manner. Typically, at least some portions of the first frame portion and the second frame portion are affixed to each other to achieve this. In some embodiments, this may be done via mechanical fastening, e.g. by the use of staples or similar fasteners. However, in many convenient embodiments, this may be performed by adhesive bonding. Thus in some embodiments, a layer of adhesive of any suitable type may be disposed on at least a portion of, for example, the hidden surfaces of one or more frame pieces. In some embodiments, such an adhesive may be coated over the entirety of the hidden surface of a frame piece. However, it may be more efficient to provide adhesive only at the locations at which it is needed for bonding.

For example, lines (elongated beads) of adhesive may be provided on some panels of a frame piece, but not on others. Thus as shown in exemplary embodiment in FIGS. 3, and 4, a line of adhesive 161 may be disposed on the hidden surface of panel 60 that will form the downstream flange of the frame portion: similarly, a line of adhesive 131 may be disposed on the hidden surface of panel 30 that will form the upstream flange of the frame portion. (For clarity, only portions of the elongate lengths of adhesive lines 131 and 161 are shown in FIGS. 3 and 4: however, in actuality, such lines may extend e.g. along the entire elongate length of the panels.)

Figure 6:
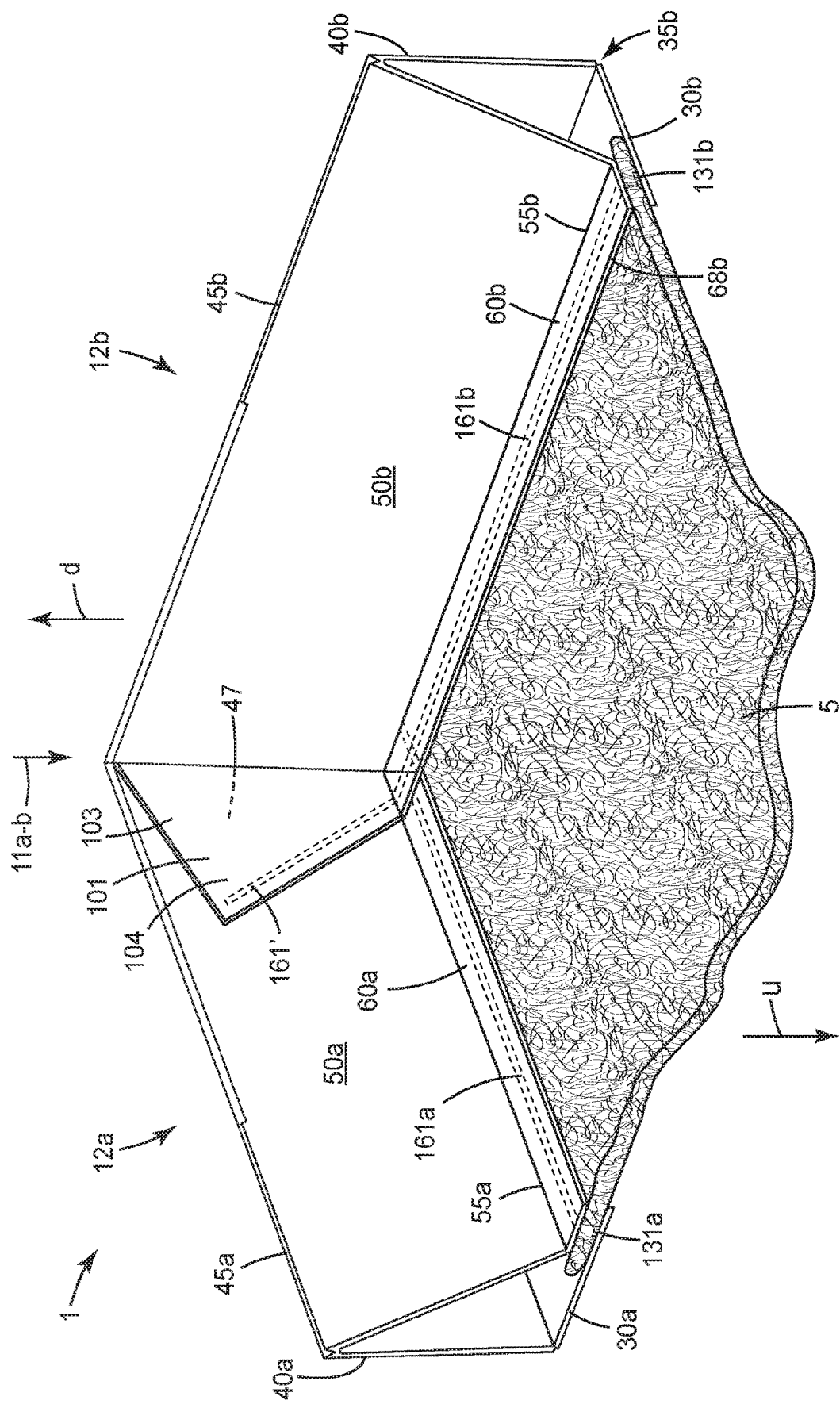
FIG. 6 is another perspective view of a corner of an exemplary framed air filter.

Such adhesive lines can serve to bond the frame portion to the filter media (e.g. along the entire length of the frame portion). Such adhesive lines can additionally, at each corner of the frame, bond the end sections of the neighboring frame portions to each other to hold the corner in the desired configuration. Adhesive lines 131a, 131b, 161a and 161b are depicted performing these functions in FIG. 6 (noting that the 161 adhesive lines are shown in broken fill since they are respectively hidden behind flanges 60a and 60b, and the only the ends of the "131" adhesives, as exposed in the slice view of FIG. 6, are shown.) Such arrangements can make it possible that, in many embodiments, the panels 40 and 50 of a frame piece (that form the outer and inner sidewalls of the resulting frame portion) need not comprise any adhesive line or bead that is disposed on a hidden surface thereof. Such an arrangement is depicted in FIGS. 3 and 4.

Stabilizing Flap

In some embodiments, at least one part of a frame portion may be affixed to a neighboring frame portion at the corner formed by the two portions. In some embodiments, one such part may be a stabilizing flap. Exemplary stabilizing flaps 101 are depicted in FIG. 4 as they may appear in frame pieces, and are depicted in FIGS. 1, 5 and 6 as they may appear in an assembled frame. As evident from these figures, a stabilizing flap 101 integrally extends from a first frame portion of a pair of neighboring frame portions that meet to form a corner of the frame. For example, as shown in FIGS. 1, 5, and 6, a stabilizing flap 101 integrally extends from first frame portion 12b of a pair of neighboring frame portions 12b and 12a that meet to form a corner 11a-b of the frame. As seen in these figures, in the assembled frame, stabilizing flap 101 can be positioned in inward, substantially coplanar relation with a corner-proximate bonding area 121 of inner sidewall 50a of second frame portion 12a. (In other words, when framed filter 1 is viewed from the downstream side as in FIGS. 1 and 5, flap 101 is visible atop an end area of the inward surface of inner sidewall 50a of frame portion 12a.) Flap 101 can be affixed to area 121 of second frame portion 12a, in any known manner. In many convenient embodiments, this may be achieved by adhesive bonding as discussed in detail below.

It has been found that the use of a stabilizing flap of this general type, can advantageously enhance the mechanical stability of the thus-formed corner. In particular, the use of stabilizing flaps at one, two, three, or all four corners of a frame, can significantly boost the resistance of the framed filter to out-of-plane twisting. While in some embodiments the mechanical strength of the frame may be further enhanced by the use of reinforcing tabs as described elsewhere herein, it is emphasized that the use of one or more stabilizing flaps is not predicated on being used in combination with reinforcing tabs.

As seen in FIG. 4, stabilizing flap 101 integrally extends from an end of first frame piece 14 and is integrally connected to the rest of frame piece 14 by a fold line 106. Fold line 106 provides that, when the frame pieces are assembled together to form a bonded corner, flap 101 can be folded so that it can be positioned in inward relation to the inner sidewall of the neighboring frame piece as described above. Fold line 106 is thus oriented at a suitable off-angle with respect to the fold lines between the various panels of the frame piece. In various embodiments, fold line 106 may be oriented at an off-angle relative to fold lines 35, 45 and/or 55 in the general manner depicted in FIG. 4. Such an off-angle may have a minimum value of e.g. 35, 40, 45, or 50 degrees. In further embodiments, such an off-angle may have a maximum value of e.g. 75, 70, 65, or 60 degrees. (Such an off-angle will be measured with the frame piece in a flat condition, prior to folding. By way of a specific example, exemplary fold line 106 in FIG. 4 is oriented at an off-angle relative to fold lines 35, 45 and 55, of approximately 55 degrees.)

Close inspection of FIG. 4 reveals that stabilizing flap 101 includes a first section (area) 103 that is a continuation of inner sidewall 50; and, a second section (area) 104 that is a continuation of downstream flange 60. These first and second sections 103 and 104 are integral with each other (as well as being integral with the respective panels from which they extend and to which they are foldably connected). It will thus be appreciated that first section 103 is foldably connected to inner sidewall 50 by fold line 106; and, second section 104 is foldably connected to downstream flange 60 by a second fold line 107. While these are identified as "first" and "second" fold lines for purposes of description, it is evident that these are actually portions of a single fold line (that is, segment 107 is a co-linear extension of line 106). Fold lines 106 and 107 (indicated in an assembled frame in FIG. 5) collectively allow section 103 (that is an extension of inner sidewall 50), and section 104 (that is an extension of downstream flange 60) to be folded so that they can both be positioned atop various portions of the inner sidewall of the neighboring frame portion shown in FIG. 5. Fold line 106 (and extension 107, if present) can be achieved by use of any scoring technique or combination thereof. In some embodiments, fold line 106 (and 107, if present) may be a cut-scored fold line.

It will be appreciated that a stabilizing flap of a bonded corner as disclosed herein is distinguished from, for example, a folded flange or flap of the general type disclosed e.g. in U.S. Pat. No. 9,962,640. A folded flap of the general type disclosed in the '640 patent is typically present at an integral corner that results from manipulating the segments of an L-shaped frame piece to provide two frame portions joined at the integral corner. The folded flap results from folding two areas of frame material together (so that the resulting flap comprises two layers of frame material rather than one) at the corner in order to deal with excess frame material that converges at the integral corner. In other words, such an approach basically involves forming a "dart" in the frame pieces so that an integral corner can be more easily formed. In contrast, the presently-disclosed stabilizing flap comprises a single layer of frame material rather than two layers. Furthermore, in many embodiments such a stabilizing flap is at a bonded corner and does not serve the purpose of dealing with excess material at an integral corner.

A stabilizing flap 101 may not necessarily have to include a second section 104 that is an extension of a downstream flange 60. That is, in some embodiments a first section 103 can be used alone (e.g. bonded to bonding area 121 of the neighboring frame portion in the manner described above). However, the inclusion of a second section 104 allows a convenient arrangement in which a line of adhesive 161b that is present along downstream flange 60, can continue (as line segment 161') into section 104 of flap 101. Although not shown in FIG. 4, such an arrangement in depicted in FIG. 6. It will be appreciated from FIG. 6 that such an arrangement allows flap 101 (specifically, area 104 of flap 101) to be bonded to the inner sidewall of the neighboring frame portion using a co-linear continuation of an existing adhesive line 161b and thus not necessitating the use of any additionally-applied adhesive.

Inspection of FIG. 5 reveals that arranging a stabilizing flap 101 in the manner described above may require that flap 101 be "reverse-folded" (relative to sidewall 50) along fold line 106 (and similarly, reverse-folded relative to downstream flange 60 along fold line extension 107, if flap 101 includes an area 104 that is a continuation of flange 60 in the manner mentioned above). While, as noted earlier herein, reverse-folding is not commonly performed in the art of producing framed filters, the present investigations have found that flap 101 can be successfully reverse-folded, at least in part because stabilizing flap 101 is not subjected to a very large folding angle. (In prototype framed-filter samples, the folding angle of flap 101 has been estimated by visual inspection as typically being in the range of 45 degrees or less.) It has further been found that if stabilizing flap 101 relies on a cut-scored fold line 106, such a fold line may be cut-scored to a lesser depth than other score lines that may be present. Thus for example, any of fold lines 35, 45, and/or 55 may be provided by a cut-score that penetrates e.g. a nominal value of 65% through the thickness of the frame piece, while a fold line 106 (and extension 107, if present) may only penetrate e.g. a nominal value of 50% through the thickness of the frame piece. Alternatively stated, in some embodiments the depth of a cut-scored fold line 106 may be in the range of e.g. 60-100, or 60-80%, of the depth of a cut-scored fold line 35, 45, or 55.

In the assembled filter frame, a majority of the area of stabilizing flap 101 (including substantially all of the above-mentioned area 103 and much of area 104, if present) of a frame portion will reside atop the surface of inner sidewall 50a of the neighboring frame portion, as is evident from FIG. 5. However, in some embodiments a small area 105 of flap 101 (specifically, a small portion of area 104 that is an extension of the downstream flange 60b from which the flap originates) may reside atop the surface of the downstream flange 60a of the neighboring frame portion, as indicated in FIG. 5. Consideration of FIG. 5 reveals that in some instances (e.g. depending on the exact configuration of the frame corner) a slight bend or fold may be present between area 105 that resides atop downstream flange 60a, and the remainder of area 104 that resides atop inner sidewall 50a. If desired, a short score line may be included to facilitate this slight bending of these two areas. However, in practice it has not been found necessary to provide such a fold line in order to achieve satisfactory performance.

In some embodiments, all four corners of frame 12 may comprise stabilizing flaps of the general type described above. The frame pieces from which such a frame is made can be configured in any suitable manner. For example, in some embodiments each of the four frame pieces may comprise a stabilizing flap at one end and no stabilizing flap at the other end. However, in some embodiments, it may be convenient to use a pair of opposing frame pieces that each have flaps at both ends (e.g. as in frame piece 14 of FIG. 4), in combination with another pair of opposing frame pieces that each do not have flaps at either end (e.g. as in frame piece 13 of FIG. 3).

The terminal edges of sections 103 and 104 (and of flap 101 as a whole) may take any desired shape. For example, rather than all such edges being essentially linear as in FIG. 4, thus producing a stabilizing tab 101 that is in the general shape of a straight-sided polygon as in FIGS. 1 and 5, some edges can be e.g. curved, e.g. so that the resulting stabilizing tab has a more rounded shape.

In some embodiments, a part of a frame piece/portion that is bonded to a neighboring frame piece may be a reinforcing tab. Such a tab may be used e.g. in addition to an above-described stabilizing flap. Exemplary reinforcing tabs 47 as they may appear on a frame piece (before being folded/assembled into a frame) are shown in FIG. 4. Such a tab may extend integrally e.g. from the outer sidewall 40 of a first frame portion of a pair of neighboring frame portions that meet to form a corner, and may be bonded to an outer sidewall of a second frame portion of the pair. For example, a reinforcing tab 47 may integrally (and foldably) extend from the outer sidewall 40 of a first frame portion by way of a tab fold line 48 as shown in FIG. 4. In assembly of frame 12, tab 47 can be folded around the frame corner so that it is in coplanar overlapping relation with a corner-proximate bonding area 125 (visible in FIG. 3) of the outer sidewall 40 of the second frame portion. Tab 47 can be affixed to area 125 in any desired manner, e.g. by adhesive bonding.

Such an arrangement is shown in exemplary manner in FIG. 1, in which a tab 47 that integrally extends from outer sidewall 40 of frame portion 12d and is foldably connected thereto by tab fold line 48, is folded around the frame corner to be in coplanar overlapping relation with corner-proximate bonding area 125 of outer sidewall 40c of neighboring frame portion 12c. Tab 47 is bonded to area 125 by way of a parcel of adhesive 141 as shown in FIG. 1. In the particular arrangement of FIG. 1, tab 47 is in outwardly overlapping relation with area 125, which may be convenient e.g. in automated assembly of such a frame. However, in some embodiments tab 47 may be in inwardly-overlapping relation with area 125 (i.e., tab 47 could be tucked inside the outer sidewall rather than being positioned outward of the outer sidewall). Similar arrangements are present in the frame corner depicted in FIGS. 5 and 6, in which a tab 47 (the general location of which is indicated by reference numeral 47) is bonded to the outer sidewall 40a of frame portion 12a (by a parcel of bonding adhesive, not shown). In the viewing angle of FIGS. 5 and 6, fold line 48 of reinforcing tab 47 coincides with the previously-described fold line 106 of the stabilizing flap.

The presence of such tab may, for example, further enhance the mechanical strength of a frame corner, and/or it may minimize the ability of air to leak through the frame corner. In some embodiments, all four corners of frame 12 may be a tabbed corner of the general type described above. The frame pieces from which such a frame is made can be configured in any suitable manner. For example, in some embodiments each of the four frame pieces may comprise a tab at one end and no tab at the other end. However, in some embodiments, it may be convenient to use a pair of opposing frame pieces that each have tabs at both ends (e.g. as in frame piece 14 of FIG. 4), in combination with another pair of opposing frame pieces that each do not have tabs at either end (e.g. as in frame piece 13 of FIG. 3). In some embodiments a first pair of opposing frame pieces may have both flaps and tabs (as in FIG. 4); and, a second pair of opposing frame pieces may have neither flaps nor tabs (as in FIG. 3).

Paperboard that is used in frame pieces is often coated (e.g. with clay or some other white pigment) for aesthetic purposes, across the entirety of the visible surface of the paperboard, e.g. in the production facility where the paperboard is made. The paperboard is typically printed with indicia, decorative designs, or the like; however, this is typically not done at the paperboard factory but rather at a converter where the paperboard is also die cut, scored, and so on. Often, the paperboard is printed (on the aesthetic side, which will become the visible surface of the assembled frame) and is then overcoated with a protective clear coat or lacquer.

The present work has revealed that in some instances, slightly enhanced bonding performance can be achieved if a protective clear coat, and/or printed matter, is not applied to end portions of a frame piece to which an adhesive is to be bonded. Thus, with reference to FIG. 3, in some embodiments, areas 133 (that lie between demarcation line 132 and the end of the frame piece) of the aesthetic surface of the frame piece may remain uncoated with clear coat and/or may remain unprinted. (Demarcation line 132 is imaginary and is shown in dotted lines.) Although not shown in FIG. 3, similar arrangements may be made at the opposite end of the frame piece. Such arrangements are optional and may or may not provide any enhancement depending e.g. on the particular method of bonding used, type of adhesive used, etc.

In some embodiments, frame pieces may be provided in identical pairs that are in opposing relation to each other. For example, a frame may comprise two opposing frame pieces of the general type shown in FIG. 3; and, two additional opposing frame pieces of the general type shown in FIG. 4. In this regard, it is noted that various components, areas and features are indicated at the left or right end of frame pieces 13 and 14 as depicted in FIGS. 3 and 4. Such components, areas and features may be, and typically are, also present at the other end of the frame piece, but are not all indicated by number in order to avoid undue clutter in the Figures.

The arrangements disclosed herein can allow the use of frame pieces that are relatively simple in design and are amenable to straightforward scoring, folding, and assembling, in comparison to various complex frame arrangements that are known in the art. This is exemplified by frame piece 13 as depicted in FIG. 3. As is evident from inspection of FIG. 3, in at least some embodiments frame piece 13 may comprise opposing terminal edges 71 that are relatively straight, with few deviations or interruptions. Such terminal edges may, for example, be aligned within plus or minus 20, or 10, degrees of perpendicular to the long axis of the frame piece, along 80, 90, 95, 98, or essentially 100% (the entirety of) the terminal edge. In some embodiments, the terminal edges of panels 30, 50 and/or 60 may be slightly angled (e.g. less than 10 degrees) away from the terminal edge of panel 40 (as evident in FIG. 3); this can provide that the terminal edge of outer sidewall 40 can be firmly abutted against the outer sidewall of the neighboring frame portion if desired.)

Similarly, in at least some embodiments a frame piece 14 as depicted in FIG. 4 may comprise opposing terminal edges 72 that (except for where interrupted by a reinforcing tab 47, if present) are relatively straight. Such terminal edges may be (disregarding a reinforcing tab 47 of an outer sidewall 40) aligned within plus or minus 20, or 10, degrees of perpendicular to the long axis of the frame piece, along 80, 90, 95, 98, or essentially 100% (the entirety of) the terminal edge.

The elongate length of frame pieces (along a left-right direction of FIGS. 3 and 4) may be chosen so that a framed filter of a desired nominal size (e.g., nominal 20"×20", 20"×25", etc.) may be assembled therefrom. The width (along an up-down direction of FIGS. 3 and 4) of a frame piece and of individual panels thereof may be chosen as desired. The widths of the various panels may be chosen in view of the various angles that are to be established and in particularly in view of whether or not the resulting frame is to be nestable. In various embodiments, the width of downstream flange 60 may be about 20-40% of the width of upstream flange 30. In various embodiments, the width of inner sidewall 50 may be about 115-135% of the width of outer sidewall 40. In various embodiments, the width of outer sidewall 40 may be about 70-90% of the width of upstream flange 30. In instances in which outer angle $\Omega$ is nominal 90 degrees, the width of panel (outer sidewall) 40 may establish the nominal thickness (referred to as filter "height" in the discussion of nestability earlier herein) of the framed filter. For example, outer sidewall 40 may comprise e.g. a ⅞" width in order to provide a nominal X"×X"×1" framed filter. (Ordinary artisans will be straightforwardly able to ascertain the filter height of a filter (e.g. a nestable filter) that has an outer angle $\Omega$ greater than 90 degrees.)

Frame pieces 13 and/or 14 may be made of any suitable material, e.g. paperboard, plastic, and so on, into which may be imparted score/fold lines as described herein. In particular embodiments, frame pieces may be made of paperboard of thickness in the range of 20-30 thousandths of an inch. In specific embodiments, frame pieces may be made of single-layer paperboard rather than corrugated paperboard. However, in some embodiments any suitable material (e.g. multilayer paperboard) may be used.

As noted, the frame pieces can be affixed to each other in any suitable manner. In many embodiments, adhesive bonding may be preferred. Any adhesive may be used, relying on any delivery system. In some embodiments a water-based adhesive composition may be used. In other embodiments a 100% solids composition, e.g. a hot-melt adhesive composition, may be used. Hot melt adhesives may be particularly suitable for being applied in elongate, e.g. narrow, lines or beads of the general type mentioned elsewhere herein. Any such adhesive may be of any suitable composition, based e.g. on ethylene-vinyl acetate polymers, acrylate polymers, polyolefins, polyamides, polyesters, and so on.

Any suitable air filter media 5 may be used in filter 1. Air filter media 5 is typically sheet-like, with a length and width that are greater than the thickness of the air filter media and with an overall planar configuration (even if pleated). Although FIGS. 1-2 illustrate an air filter 1 comprising nonpleated filter media 5, any suitable filter media, including pleated media, may be used. In some embodiments, filter media 5 may comprise an electret-comprising nonwoven material. In some embodiments, filter media 5 may comprise fiberglass fibers.

In some embodiments, filter media 5 (whether pleated or in substantially flat state or otherwise), may include one or more layers comprising e.g. a porous media, a nonwoven scrim, a set of reinforcing filaments, a netting, a wire meshes, or any such structure(s), which may be provided along with the filter media (e.g., bonded thereto) and which may be made of any suitable material. In particular embodiments, filter media 5 may comprise reinforcing filaments of the general type described in U.S. Provisional Patent Applications 62/714,178 and 62/714,186, both of which are incorporated by reference in their entirety herein. In other embodiments, no such reinforcing filaments, nettings, scrims, etc. are present.

The arrangements disclosed herein may be implemented in any suitable manner. In some embodiments some or all such processes (e.g. folding of frame pieces to form frame portions, mounting of frame portions on edges of filter media, affixing ends of frame portions to ends of neighboring frame portions, affixing the filter media to the frame, and so on) may be performed manually. In some embodiments, some of all of such processes may be performed e.g. by robotic machinery. In some embodiments robotic machinery may perform any or all of the following operations: deposit elongate adhesive beads on hidden surfaces of selected panels of frame pieces (e.g., panels that will form upstream and downstream flanges of the finished frame): fold frame pieces into frame portions; mount frame portions onto the edges of filter media; bring together the ends of frame portions to form corners; and, hold the thus-formed frame in position for a sufficient time for the adhesive to harden.

It will be apparent to those skilled in the art that the specific exemplary embodiments, elements, structures, features, details, arrangements, configurations, etc., that are disclosed herein can be modified and/or combined in numerous ways. It is emphasized that any embodiment disclosed herein may be used in combination with any other embodiment or embodiments disclosed herein, as long as the embodiments are compatible. While a limited number of exemplary combinations are presented herein, it is emphasized that all such combinations are envisioned.

Numerous variations and combinations are contemplated as being within the bounds of the conceived invention, not merely those representative designs that were chosen to serve as exemplary illustrations. Thus, the scope of the present invention is not limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification and the disclosure in any document that is incorporated by reference herein but to which no priority is claimed, this specification as written will control.

What is claimed is:

1. A framed air filter, comprising:
    an air filter media comprising an at least generally rectangular perimeter with four major elongate edges; and,
    a four-cornered frame comprising four elongate frame portions, each elongate frame portion being mounted on one of the four major elongate edges of the filter media and with pairs of neighboring frame portions meeting to form a corner of the four corners of the frame,
        wherein each of the four elongate frame portions comprises an elongate inner sidewall and an elongate outer sidewall that meet at a sidewall junction, an elongate upstream flange that meets the elongate outer sidewall at an outer junction, and an elongate downstream flange that meets the elongate inner sidewall at an inner junction,
        wherein at least one corner of the four corners of the frame is a non-integral, bonded corner configured so that a stabilizing flap that integrally extends from a first frame portion of a pair of neighboring frame portions that meet to form the non-integral, bonded corner, is in inward, substantially coplanar overlapping relation with, and is affixed to, a corner-proximate bonding area of an elongate inner sidewall of a second frame portion of the pair of neighboring frame portions; and,
        wherein all four corners of the frame are bonded corners and no corner of the frame is an integral corner, wherein each of the four non-integral, bonded corners is configured so that the first frame portion of a pair of neighboring frame portions that forms the non-integral, bonded corner, comprises a stabilizing flap that integrally extends from the first frame portion and is in inward, substantially coplanar overlapping relation with, and is affixed to, a corner-proximate bonding area of the elongate inner sidewall of the second frame portion of the pair of neighboring frame portions, and is in inward, substantially coplanar overlapping relation with, and is affixed to, a corner-proximate bonding area of the downstream flange of the second frame portion of the pair of neighboring frame portions.

2. The framed air filter of claim 1 wherein the stabilizing flap comprises first and second integral sections, wherein the first integral section of the stabilizing flap integrally extends from the elongate inner sidewall of the first frame portion and wherein the second integral section of the stabilizing flap integrally extends from the elongate downstream flange of the first frame portion.

3. The framed air filter of claim 2 wherein the first integral section of the stabilizing flap is foldably connected to the elongate inner sidewall of the first frame portion by a first fold line and wherein the second integral section of the stabilizing flap is foldably connected to the elongate downstream flange of the first frame portion by a second fold line that is a co-linear continuation of the first fold line.

4. The framed air filter of claim 2 wherein a line of adhesive is provided along the long axis of a hidden surface of the elongate downstream flange of the first frame portion and wherein a continuation of the line of adhesive extends along a hidden surface of the second integral section of the stabilizing flap, and wherein the stabilizing flap is affixed to the second frame portion by way of the adhesive on the second integral section of the stabilizing flap being bonded to a downstream surface of a portion of the corner-proximate area of the elongate inner sidewall of the second frame portion and being bonded to a downstream surface of a portion of a corner-proximate area of the elongate downstream flange of the second frame portion.

5. The framed air filter of claim 4 wherein each of the four frame portions comprises a first line of adhesive provided along a hidden surface of the elongate downstream flange of the frame portion, and a second line of adhesive provided along a hidden surface of the elongate upstream flange of the frame portion.

6. The framed air filter of claim 1 wherein for each frame portion, the elongate inner sidewall of the frame portion and the elongate outer sidewall portion meet at the sidewall junction to form a sidewall angle σ that is greater than 20 degrees, and the elongate outer sidewall of the frame portion and the upstream flange of the frame portion meet at the outer junction to form an outer angle Ω that is approximately 80-100 degrees, so that the framed air filter is not nestable.

7. The framed air filter of claim 1 wherein at the non-integral, bonded corner of the frame, the elongate outer sidewall of a first frame portion of the pair of neighboring frame portions that meet to form the non-integral, bonded corner, comprises a reinforcing tab that extends integrally from the elongate outer sidewall and is foldably connected thereto, and wherein the reinforcing tab is in coplanar overlapping relation with, and is affixed to, a corner-proximate bonding area of the elongate outer sidewall of the second frame portion of the pair of neighboring frame portions that meet to form the non-integral, bonded corner.

8. The framed air filter of claim 7 wherein the reinforcing tab integrally extends from, and is foldably connected to, the elongate outer sidewall of the first frame portion by a tab fold line; and, wherein the corner-proximate bonding area is an area of an outward surface of the elongate outer sidewall of the second frame portion and wherein the reinforcing tab outwardly overlaps the corner-proximate bonding area of the outward surface of the elongate outer sidewall of the second frame portion and is adhesively bonded thereto.

9. The framed air filter of claim 1 wherein for each of the four bonded corners of the frame, the first frame portion of the pair of neighboring frame portions that form the bonded corner, comprises a reinforcing tab that extends integrally from the elongate outer sidewall of the first frame portion and is foldably connected thereto by a tab fold line, and wherein the reinforcing tab is in coplanar outwardly overlapping relation with, and is adhesively bonded to, a corner-proximate bonding area of the elongate outer sidewall of the second frame portion of the pair of neighboring frame portions.

10. The framed air filter of claim 1 wherein for each of the four bonded corners of the frame, end sections of the elongate downstream flange and the elongate upstream flange of the second frame portion of the pair of neighboring frame portions that meet to form the corner, are sandwiched, along an upstream-downstream direction, between end sections of the elongate downstream flange and the elongate upstream flange of the first frame portion of the pair of neighboring frame portions.

11. The framed air filter of claim 1 wherein the elongate downstream flange and the elongate inner sidewall of the frame portion meet at the inner junction to define an inner angle that is 120 degrees or greater.

12. The framed air filter of claim 1 wherein at least a portion of the stabilizing flap is foldably connected to the elongate inner sidewall of the first frame portion by a cut-scored fold line and wherein the stabilizing flap is reverse-folded with respect to the first frame portion.

13. The framed air filter of claim 1 wherein at least a portion of the stabilizing flap is foldably connected to the elongate inner sidewall of the first frame portion by a perf-scored fold line.

14. The framed air filter of claim 1 wherein for each elongate frame portion the elongate upstream flange, the elongate downstream flange, the elongate outer sidewall, and the elongate inner sidewall, are all integral with each other.

15. The framed air filter of claim 1 wherein each of the four frame portions is provided by a separately-made frame piece, which four frame pieces are assembled together to form the frame with each frame piece providing one frame portion, such that all four corners of the frame are bonded corners and no corner of the frame is an integral corner.

16. A method of making the framed air filter of claim 1, the method comprising:
folding first and second frame pieces to form first and second frame portions, each frame portion comprising an elongate inner sidewall and an elongate outer sidewall that meet at a sidewall junction, an elongate upstream flange that meets the elongate outer sidewall at an outer junction, and an elongate downstream flange that meets the elongate inner sidewall at an inner junction;
mounting the first and second frame portions on first and second edges of a sheet of filter media so that an end of the first frame portion and an end of the second frame portion meet to define a corner of the frame;
positioning a stabilizing flap that integrally extends at least from the elongate inner sidewall of the first frame portion and is foldably connected thereto by a fold line, so that the stabilizing flap is in inward, substantially coplanar overlapping relation with at least a corner-proximate bonding area of the elongate inner sidewall of the second frame portion;
and,
affixing the stabilizing flap to the corner-proximate bonding area.

17. A framed air filter, comprising:
an air filter media comprising an at least generally rectangular perimeter with four major elongate edges;
and,
a four-cornered frame comprising four elongate frame portions, each elongate frame portion being mounted on one of the four major elongate edges of the filter media and with pairs of neighboring frame portions meeting to form a corner of the four corners of the frame,
wherein each of the four elongate frame portions comprises an elongate inner sidewall and an elongate outer sidewall that meet at a sidewall junction, an elongate upstream flange that meets the elongate outer sidewall at an outer junction, and an elongate downstream flange that meets the elongate inner sidewall at an inner junction,
wherein at least one corner of the four corners of the frame is a non-integral, bonded corner configured so that a stabilizing flap that integrally extends from a first frame portion of a pair of neighboring frame portions that meet to form the non-integral, bonded corner, is in inward, substantially coplanar overlapping relation with, and is affixed to, a corner-proximate bonding area of an elongate inner sidewall of a second frame portion of the pair of neighboring frame portions;
wherein each of the four frame portions is provided by a separately-made frame piece, which four frame pieces are assembled together to form the frame with each frame piece providing one frame portion, such that all four corners of the frame are bonded corners and no corner of the frame is an integral corner;
wherein a first pair of opposing frame pieces of the four frame pieces each comprise first and second stabilizing flaps that integrally extend from opposing terminal ends of at least an inner sidewall panel of the frame piece; and, wherein the first pair of opposing frame pieces each further comprise first and second reinforcing tabs that integrally extend from opposing terminal ends of an outer sidewall panel of the frame piece;
wherein a second pair of opposing frame pieces, which are arranged around the perimeter of the filter media in alternating sequence with the first pair of opposing frame pieces, do not comprise any stabilizing flaps and do not comprise any reinforcing tabs;
and wherein the first pair of opposing frame pieces each comprise opposing terminal ends exhibiting terminal edges that are aligned within plus or minus 20 degrees of perpendicular to the long axis of the frame piece along the entirety of each terminal edge, except for along the reinforcing tab that extends from the outer sidewall panel.

* * * * *